(12) United States Patent
Rangan et al.

(10) Patent No.: US 8,432,852 B2
(45) Date of Patent: Apr. 30, 2013

(54) UPLINK TIMING CONTROL SIGNAL

(75) Inventors: Sundeep Rangan, Jersey City, NJ (US); Junyi Li, Bedminster, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 902 days.

(21) Appl. No.: 11/486,652

(22) Filed: Jul. 14, 2006

(65) Prior Publication Data
US 2008/0013478 A1 Jan. 17, 2008

(51) Int. Cl.
H04W 4/00 (2009.01)
(52) U.S. Cl.
USPC ............ 370/328; 370/350; 370/334; 455/403
(58) Field of Classification Search .................. 455/456, 455/403, 517, 561; 370/338, 208, 345, 458, 370/328, 522, 350, 334; 375/260, 343, 144; 342/357
See application file for complete search history.

(56) References Cited

U.S. PATENT DOCUMENTS

| | | | | |
|---|---|---|---|---|
| 5,896,425 A * | 4/1999 | Hirano et al. | ............... | 375/354 |
| 5,909,436 A | 6/1999 | Engstrom et al. | | |
| 6,157,621 A * | 12/2000 | Brown et al. | ............... | 370/310 |
| 6,487,252 B1 * | 11/2002 | Kleider et al. | ............... | 375/260 |
| 6,628,697 B1 | 9/2003 | Douglas et al. | | |
| 6,751,444 B1 * | 6/2004 | Meiyappan | ................ | 455/69 |
| 6,922,388 B1 * | 7/2005 | Laroia et al. | ............... | 370/208 |
| 6,967,936 B1 * | 11/2005 | Laroia et al. | ............... | 370/329 |
| 7,212,564 B2 * | 5/2007 | Parizhsky | ................ | 375/144 |
| 7,492,785 B2 | 2/2009 | Seligman et al. | | |
| 7,535,822 B2 * | 5/2009 | Geile et al. | ................ | 370/208 |
| 7,574,224 B2 | 8/2009 | Lane et al. | | |
| 7,869,421 B2 | 1/2011 | Rangan et al. | | |
| 2001/0043572 A1 | 11/2001 | Bilgic et al. | | |

(Continued)

FOREIGN PATENT DOCUMENTS

| EP | 2052472 A2 | 4/2009 |
|---|---|---|
| JP | 2001257657 | 9/2001 |

(Continued)

OTHER PUBLICATIONS

Wahlqvist M. et al.: "Time synchronization in the uplink of an OFDM system" Vehicular Technology Conference, 1996. Mobile Technology for the Human Race., IEEE 46th Atlanta, GA, USA, Apr. 28-May 1, 1996, New York, NY, USA, IEEE, US, vol. 3, pp. 1569-1573, XP010162657, ISBN: 0-7803-3157-5.

(Continued)

*Primary Examiner* — Mahendra Patel
(74) *Attorney, Agent, or Firm* — Sam Talpalatsky; Nicholas J. Pauley; Joseph Agusta

(57) ABSTRACT

The claimed subject matter relates to systems and methodologies for synchronizing timing between a base station and a wireless terminal. For example, a set of non-contiguous tones may be assigned to the terminal, and may be equally spaced apart from each other across a spectrum of all available tones. A set of contiguous tones may also be assigned to the terminal, which may transmit a timing control signal during a specified transmit time. A base station may receive the signal, which comprises information related to the non-contiguous and contiguous tone sets, and may determine a distance of the terminal to the base station based on measured and anticipated arrival time of the signal. The base station may transmit a timing correction command signal to the terminal based on such information.

42 Claims, 12 Drawing Sheets

U.S. PATENT DOCUMENTS

| | | | |
|---|---|---|---|
| 2002/0105928 A1* | 8/2002 | Kapoor et al. | 370/334 |
| 2003/0026371 A1* | 2/2003 | Laroia et al. | 375/362 |
| 2004/0037311 A1* | 2/2004 | Willes et al. | 370/465 |
| 2004/0086027 A1* | 5/2004 | Shattil | 375/146 |
| 2004/0142696 A1 | 7/2004 | Saunders et al. | |
| 2004/0184484 A1* | 9/2004 | Marchok et al. | 370/480 |
| 2004/0213326 A1* | 10/2004 | Parizhsky et al. | 375/133 |
| 2004/0228283 A1* | 11/2004 | Naguib et al. | 370/252 |
| 2005/0063331 A1 | 3/2005 | Kim et al. | |
| 2005/0124345 A1 | 6/2005 | Laroia et al. | |
| 2005/0281239 A1* | 12/2005 | Williams | 370/343 |
| 2006/0035643 A1* | 2/2006 | Vook et al. | 455/450 |
| 2006/0062289 A1* | 3/2006 | Hiremath et al. | 375/222 |
| 2006/0094435 A1* | 5/2006 | Thomas et al. | 455/450 |
| 2006/0233271 A1* | 10/2006 | Savas et al. | 375/260 |
| 2007/0019552 A1* | 1/2007 | Senarath et al. | 370/235 |
| 2007/0183386 A1* | 8/2007 | Muharemovic et al. | 370/344 |
| 2009/0016249 A1* | 1/2009 | Li et al. | 370/310.1 |
| 2011/0075639 A1 | 3/2011 | Rangan et al. | |

FOREIGN PATENT DOCUMENTS

| | | |
|---|---|---|
| JP | 2006054860 A | 2/2006 |
| WO | WO0249305 | 6/2002 |
| WO | WO2005022772 A1 | 3/2005 |
| WO | WO2005120182 | 12/2005 |

OTHER PUBLICATIONS

International Search Report—PCT/US07/073551, International Search Authority—European Patent Office—Apr. 23, 2008.

Written Opinion—PCT/US07/073551, International Search Authority—European Patent Office—Apr. 23, 2008.

\* cited by examiner

UPLINK TIMING CONTROL SIGNAL

CROSS-REFERENCE

This application contains subject matter related to co-filed U.S. patent application Ser. No. 11/486,540, entitled UPLINK ACCESS REQUEST IN AN OFDM COMMUNICATION ENVIRONMENT, filed on Jul. 14, 2006, now U.S. Pat. No. 7,869,421 and assigned to the assignee of the present application, the entirety of which is hereby incorporated by reference.

BACKGROUND

I. Field

The following description relates generally to communications systems, and more particularly to increasing channel acquisition capability for a wireless terminal.

II. Background

Wireless networking systems have become a prevalent means to communicate with others worldwide. Wireless communication devices, such as cellular telephones, personal digital assistants, and the like have become smaller and more powerful in order to meet consumer needs and to improve portability and convenience. Consumers have become dependent upon these devices, demanding reliable service, expanded areas of coverage, additional services (e.g., web browsing capabilities), and continued reduction in size and cost of such devices.

A typical wireless communication network (e.g., employing frequency, time, and code division techniques) includes one or more base stations that provides coverage areas to subscribers as well as mobile (e.g., wireless) devices that can transmit and receive data within the coverage areas. A typical base station can simultaneously transmit multiple data streams to multiple devices for broadcast, multicast, and/or unicast services, wherein a data stream is a stream of data that can be of independent reception interest to a user device. A user device within the coverage area of that base station can be interested in receiving one, more than one or all the data streams carried by the composite stream. Likewise, a user device can transmit data to the base station or another user device.

In a multiple access communication system, multiple wireless devices communicate with a single base station simultaneously. In some scenario, e.g., in a CDMA system, it is acceptable that those wireless devices are not synchronized. However, in another scenario, e.g., in an OFDM system, it is desired that the signals transmitted from those wireless devices are timing synchronized with the receiver at the base station. Advantageously, under certain conditions, the signals can be made orthogonal with each other, thereby reducing mutual interference. One technical challenge is to maintain the timing synchronization, in particular if the wireless terminals may move around and therefore the propagation delay may vary. An unmet need exists in the art for systems and/or methodologies that facilitate ensuring that the wireless devices can achieve timing synchronization with the base station while the wireless devices are connected with the base station.

SUMMARY

The following presents a simplified summary in order to provide a basic understanding of some aspects of the claimed subject matter. This summary is not an extensive overview, and is not intended to identify key/critical elements or to delineate the scope of the claimed subject matter. Its sole purpose is to present some concepts in a simplified form as a prelude to the more detailed description that is presented later.

In accordance with various aspects, a method of synchronizing a wireless terminal with a base station in an OFDM wireless communication environment may comprise receiving a signal comprising a set of tones from a wireless terminal wherein the tone spacing between any adjacent two tones is not equal, and determining an arrival time of the signal. The method may further comprise comparing the arrival time of the signal to a target arrival time window and transmitting a timing correction command that is generated as a function of the comparison of the arrival time to the target arrival time window, to the wireless terminal.

According to another aspect, an apparatus that facilitates performing timing synchronization between a wireless terminal and a base station may comprise a receiver in a base station that receives a signal comprising a set of tones from a wireless terminal, wherein the tone spacing between any two adjacent tones is unequal. The apparatus may additionally comprise a processor that determines an arrival time of the signal and compares the arrival time of the signal to a target arrival time, and a transmitter that sends a timing correction command to the wireless terminal, wherein the processor generates the timing correction command as a function of the comparison of the arrival time to the target arrival time window.

Another aspect relates to an apparatus that facilitates synchronizing a wireless terminal and a base station, comprising, means for receiving a signal from a wireless terminal, the signal comprising a set of tones, wherein adjacent tones are unequally spaced, and means for determining an arrival time of the signal at the base station. The apparatus may further comprise means for comparing the arrival time to a target arrival time, means for generating a timing correction command signal that synchronizes the base station and the wireless terminal, and means for transmitting the timing correction command signal to the wireless terminal.

According to still another aspect, a computer-readable medium having stored thereon computer-readable instructions, the instructions comprising receiving a signal comprising a set of tones from a wireless terminal, wherein adjacent tones are not equally spaced, analyzing the signal to determine an arrival time of the signal, and comparing the arrival time of the signal to a target arrival time window. The instructions may further comprise transmitting a timing correction command that is generated as a function of the comparison of the arrival time to the target arrival time window, to the wireless terminal.

Yet another aspect relates to a processor that executes instructions for synchronizing a wireless terminal and a base station in a wireless communication environment, the instructions comprising receiving a signal comprising a set of tones from a wireless terminal, wherein tones that are adjacent to each other are unequally spaced apart, analyzing the signal to determine an arrival time of the signal, comparing the arrival time of the signal to a target arrival time; and transmitting a timing correction command that is generated as a function of the comparison of the arrival time to the target arrival time window, to the wireless terminal.

According to other aspects, a method of synchronizing a wireless terminal to a base station in a communication environment may comprise transmitting a signal comprising a set of tones from a wireless terminal wherein the tone spacing between any adjacent two tones is not equal, receiving a timing control command that is a function of a comparison of the arrival time of the signal as determined from the set of tones and an expected arrival time of the signal, and adjusting timing control for the wireless terminal based on the timing control command.

Another aspect relates to an apparatus that facilitates synchronizing a wireless terminal to a base station in a wireless communication environment, comprising a receiver that receives a tone set assignment comprising a first subset of non-contiguous tones and a second subset of contiguous tones, and a transmission time assignment defining a time at which the wireless terminal is to transmit a signal. The apparatus may further comprise a processor that generates a signal comprising information related to the tone set, and a transmitter that transmits the signal at the assigned transmission time to a base station, wherein the receiver receives a timing control command that is generated as a function of the transmitted signal.

Still another aspect relates to an apparatus that facilitates synchronizing a wireless terminal to a base station in a wireless communication environment, comprising means for transmitting a signal comprising a set of tones from a wireless terminal wherein the tone spacing between any adjacent two tones is not equal, means for receiving a timing control command that is a function of a comparison of the arrival time of the signal as determined from the set of tones and an expected arrival time of the signal and means for adjusting timing control for the wireless terminal based on the timing control command.

A further aspect relates to a computer-readable medium having stored thereon computer-executable instructions for transmitting a signal comprising a set of tones from a wireless terminal wherein the tone spacing between any adjacent two tones is not equal, receiving a timing control command that is a function of a comparison of the arrival time of the signal as determined from the set of tones and an expected arrival time of the signal, and adjusting timing control for the wireless terminal based on the timing control command.

According to another aspect, a processor that executes computer-executable instructions for synchronizing a base station and a wireless terminal may execute instructions comprising transmitting a signal comprising a set of tones from a wireless terminal wherein the tone spacing between any adjacent two tones is not equal, receiving a timing control command that is a function of a comparison of the arrival time of the signal as determined from the set of tones and an expected arrival time of the signal, and adjusting timing control for the wireless terminal based on the timing control command.

To the accomplishment of the foregoing and related ends, certain illustrative aspects are described herein in connection with the following description and the annexed drawings. These aspects are indicative, however, of but a few of the various ways in which the principles of the claimed subject matter may be employed and the claimed subject matter is intended to include all such aspects and their equivalents. Other advantages and novel features may become apparent from the following detailed description when considered in conjunction with the drawings.

DETAILED DESCRIPTION

Figure 1:
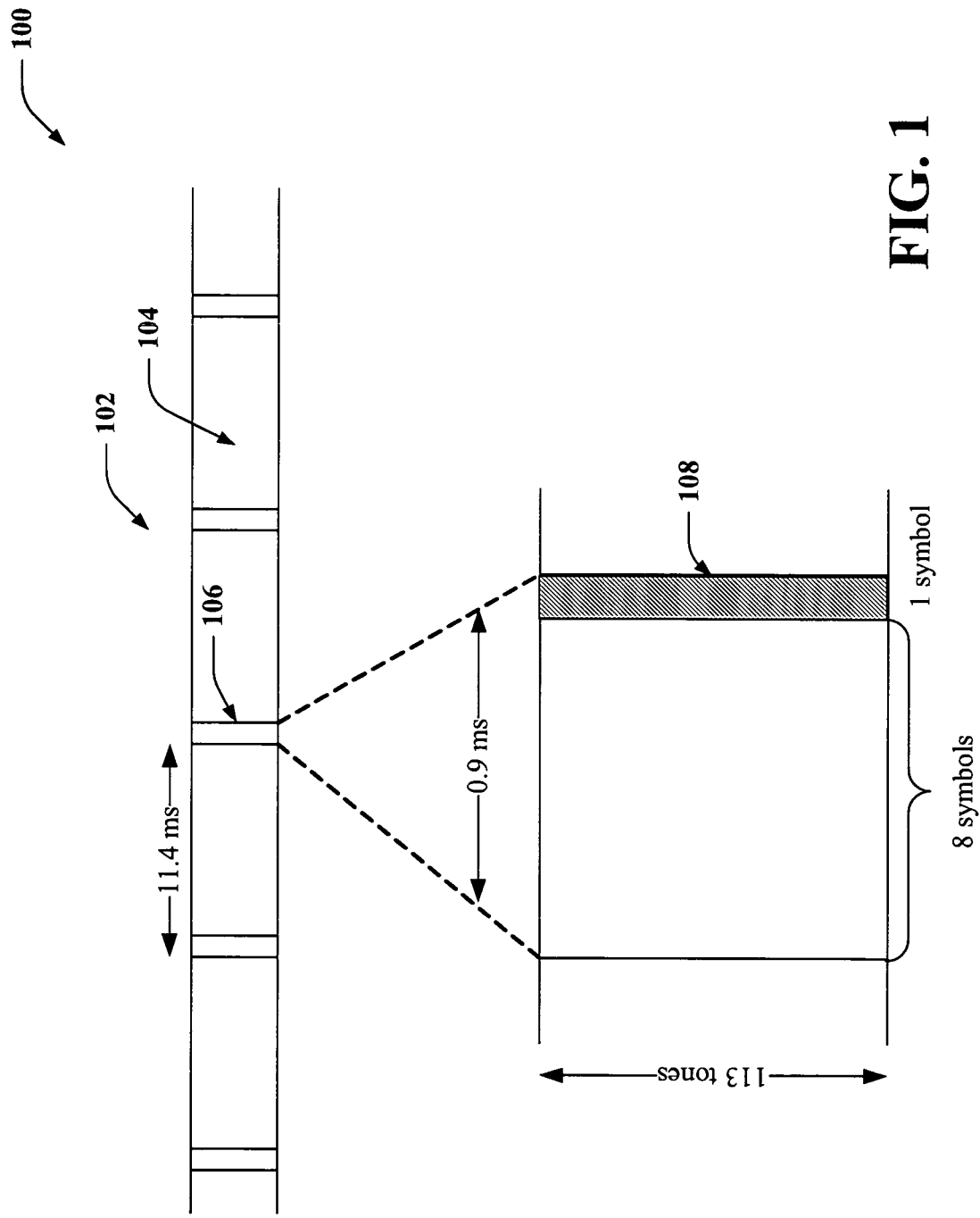
FIG. 1 illustrates a system that facilitates providing timing synchronization between a wireless terminal and a base station using an access channel timing control segment, in conjunction with various aspects.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that such subject matter may be practiced without these specific details. In other instances, well-known structures and devices are shown in block diagram form in order to facilitate describing the claimed subject matter.

Furthermore, various aspects are described herein in connection with a user device. A user device can also be called a system, a subscriber unit, subscriber station, mobile station, mobile device, remote station, remote terminal, access terminal, user terminal, wireless terminal, terminal, user agent, or user equipment. A user device can be a cellular telephone, a cordless telephone, a Session Initiation Protocol (SIP) phone, a wireless local loop (WLL) station, a PDA, a handheld device having wireless connection capability, or other processing device connected to a wireless modem.

Moreover, aspects of the claimed subject matter may be implemented as a method, apparatus, or article of manufacture using standard programming and/or engineering techniques to produce software, firmware, hardware, or any combination thereof to control a computer or computing components to implement various aspects of the claimed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving voice mail or in accessing a network such as a cellular network. Of course, those skilled in the art will recognize many modifications may be made to this configuration without departing from the scope or spirit of what is described herein.

FIG. 1 illustrates a system 100 that facilitates providing timing synchronization between a wireless terminal and a base station using an access channel timing control segment, in conjunction with various aspects. As illustrated, an ultraframe 102 comprises a plurality of superframes 104, each of which has a duration of approximately 11.4 milliseconds. At or near the beginning of each superframe 104 is an acquisition period 106 (e.g., an uplink access channel), which may be approximately 9 symbols in length, or approximately 0.9 milliseconds. A total of 113 tones, or subcarriers, may be transmitted during a given symbol, and the total or a portion of those 113 tones, e.g., 112 tones, may be divided into subgroups, each comprising a predetermined number (e.g., 8, 16, etc.) of tones. For example, the first 8 symbols of the 9-symbol acquisition period 106 may be utilized to request and/or receive access to one or more channels for communication with the base station, while the last symbol 108 of the 9-symbol acquisition period 106 may be used to transmit timing-synchronized signals by the wireless devices that have already been connected to the base station and that have been timing-synchronized with the base station.

The following discussion relates to the uplink access channel, UL.ACH, and acquisition thereof, and is intended to facilitate understanding of the various aspects presented herein. The UL.ACH channel may make exclusive use of OFDM symbol having a UL superslot OFDM symbol index of 0:8 in any superslot, and may be divided into three subchannels. The UL.ACH.AR subchannel may be utilized to transmit access request signals, such as two 8-tone signals. The UL.ACH.PA subchannel may be utilized to send an acknowledgement to a downlink paging channel (DL.PCH), and the UL.ACH.TC subchannel may be employed to send timing control signals. Tone indexing may be performed on a post-hop basis, where a base tone is predefined as a zero-tone (0-tone). Thus, the index of a tone corresponds directly to the physical frequency location of the tone. The set of OFDM symbols having a UL superslot OFDM symbol index of 0:8 may be referred to as the ULACH interval, which may be utilized such that UL.ACH.AR and UL.ACH.PA may be employed during symbols 0:3 and UL.ACH.TC may be employed during symbol 8, while symbols 4:7 remain reserved (e.g., no signal is transmitted during the fourth through the seventh symbols of the UL access channel).

The UL.ACH.TC subchannel may be utilized to send timing control signals. In the example, there are 7 UL.ACH.TC segments in a superslot. A plurality of tone sets may be defined to describe the timing control subchannel, which may be specified with the indices of the tone sets and the indices of the OFDM symbol during which the segment occupies the tone sets, as shown in Tables 1 and 2.

TABLE 1

Tone sets for UL.ACH channels

| Index of tone set | indexes of tones of a tone set |
|---|---|
| 0 | 0, 15, 30, 45, 60, 75, 90, 105, 7, 8, 9, 10, 11, 12, 13, 14 |
| 1 | 1, 16, 31, 46, 61, 76, 91, 106, 22, 23, 24, 25, 26, 27, 28, 29 |
| 2 | 2, 17, 32, 47, 62, 77, 92, 107, 37, 38, 39, 40, 41, 42, 43, 44 |
| 3 | 3, 18, 33, 48, 63, 78, 93, 108, 52, 53, 54, 55, 56, 57, 58, 59 |
| 4 | 4, 19, 34, 49, 64, 79, 94, 109, 67, 68, 69, 70, 71, 72, 73, 74 |
| 5 | 5, 20, 35, 50, 65, 80, 95, 110, 82, 83, 84, 85, 86, 87, 88, 89 |
| 6 | 6, 21, 36, 51, 66, 81, 96, 111, 97, 98, 99, 100, 101, 102, 103, 104 |

TABLE 2

Channel segments for UL.ACH.TC

| Index of UL.ACH.TC segments | Index of tone sets | ulSuperslotOFDMSymbol Index |
|---|---|---|
| Segment [0] | 0 | 8 |
| Segment [1] | 1 | 8 |
| Segment [2] | 2 | 8 |
| Segment [3] | 3 | 8 |
| Segment [4] | 4 | 8 |
| Segment [5] | 5 | 8 |
| Segment [6] | 6 | 8 |

In accordance with one or more aspects, a first wireless terminal may be assigned a first set of tones such as tone set 0 of table 1. A second wireless terminal may be assigned tone set 1, and so on. In general, each set of tones comprise tones of which the tone spacing of any two adjacent tones is not equal. The tone spacing of any two tones is defined to be the number of tones between the two tones (not including the two tones). In particular, a tone set comprises a subset of non-contiguous tones and another subset of contiguous tones. The size of the two subsets may be the same. For example, the size is equal to 8 tones. In one embodiment, the non-contiguous tones are equally spaced and the tone spacing between any two adjacent tones are at least equal to 1. A given wireless terminal may transmit a timing channel signal over its assigned subset of non-contiguous tone set (e.g., utilizing UL.ACH.TC during a last symbol period of an acquisition period). The given wireless terminal may also transmit the timing channel signal over the second assigned subset of contiguous tones in the same OFDM symbol. In another embodiment, the wireless terminal transmits the assigned subset of the non-contiguous tone set in one OFDM symbol and the assigned subset of the contiguous tone set in a different OFDM symbol. The base station may receive the signal from the wireless terminal and may analyze it to determine the arrival time of the signal relative to a timing window at the base station receiver. There are a number of ways to determine the arrival time of the signal. For instance, the signal from the contiguous tone set may be used to determine the rough arrival time and the non-contiguous tones, which may be evenly spaced apart across the total available 113 tones, may be utilized to determine the arrival time with a finer granularity. This is because the signal of equally spaced non-contiguous tones provide finer timing resolution but with timing ambiguity of $1/(N+1)$ of the symbol period, where N is equal to the tone spacing. On the other hand, the signal of contiguous tones has no timing ambiguity, though the timing resolution is coarse.

Figure 2:
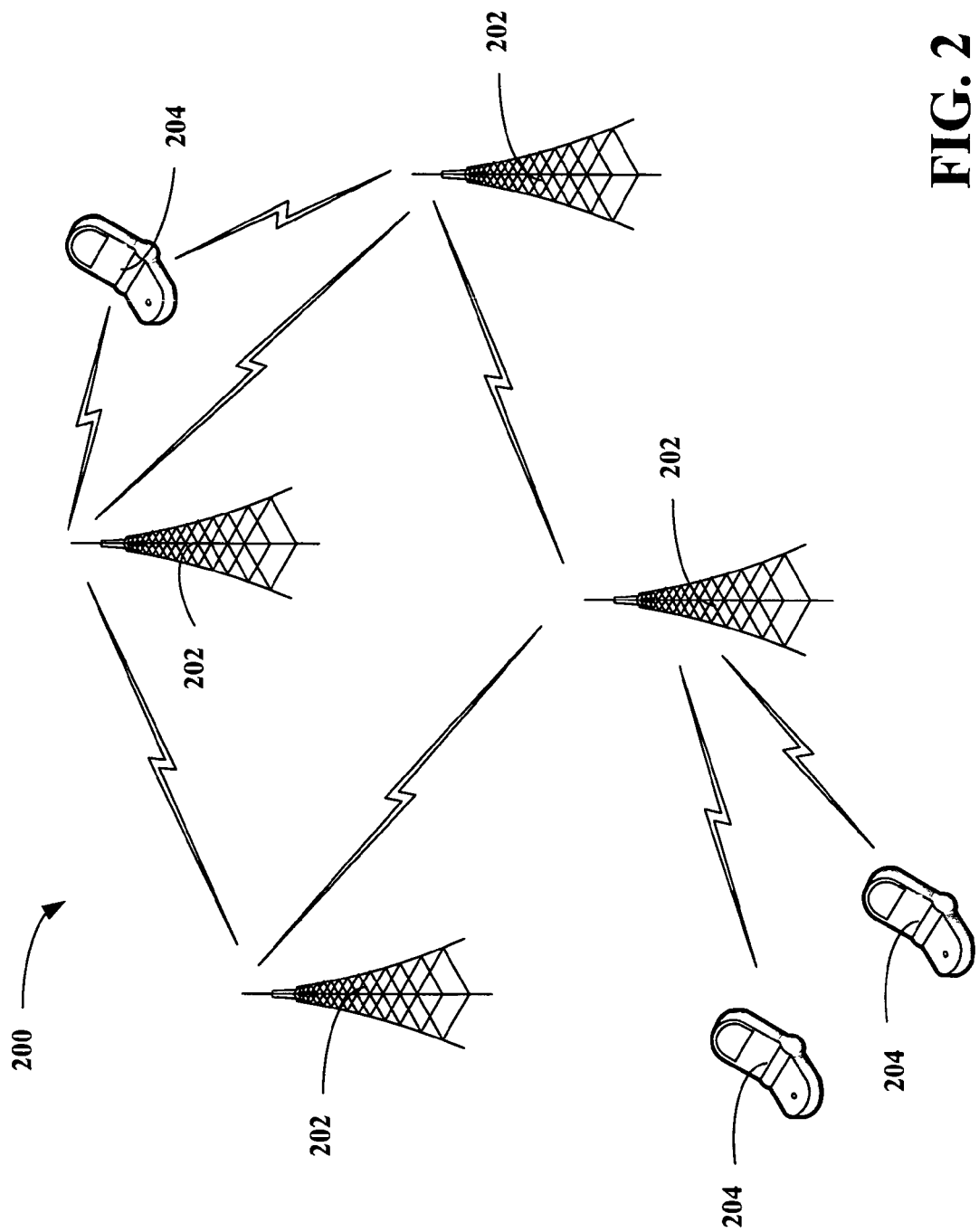
FIG. 2 is an illustration of a wireless communication system.

Referring now to FIG. 2, an example wireless communication system 200 is illustrated. System 200 can include one or more base stations 202 in one or more sectors that receive, transmit, repeat, etc., wireless communication signals to each other and/or to one or more mobile devices 204. A base station may be a fixed station used for communicating with terminals and may also be referred to as an access point, a Node B, or other terminology. Each base station 202 can comprise a transmitter chain and a receiver chain, each of which can in turn comprise a plurality of components associated with signal transmission and reception (e.g., processors, modulators, multiplexers, demodulators, demultiplexers, antennas, . . . ), as will be appreciated by one skilled in the art. Mobile devices 204 can be, for example, cellular phones, smart phones, laptops, handheld communication devices, handheld computing devices, satellite radios, global positioning systems, PDAs, and/or any other suitable device for communicating over wireless system 200. In addition, each mobile device 204 can comprise one or more transmitter chains and receiver chains, such as used for a multiple input multiple output (MIMO) system. Each transmitter and receiver chain can include a plurality of components associated with signal transmission and reception (e.g., processors, modulators, multiplexers, demodulators, demultiplexers, antennas, . . . ), as will be appreciated by one skilled in the art. Each mobile device 204 may transmit over an assigned tone set to a base station 202 to provide timing control information to the base station 202.

Referring to FIGS. 3-6, methodologies relating to improving timing control for a wireless terminal are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be utilized to implement a methodology in accordance with the claimed subject matter.

Figure 3:
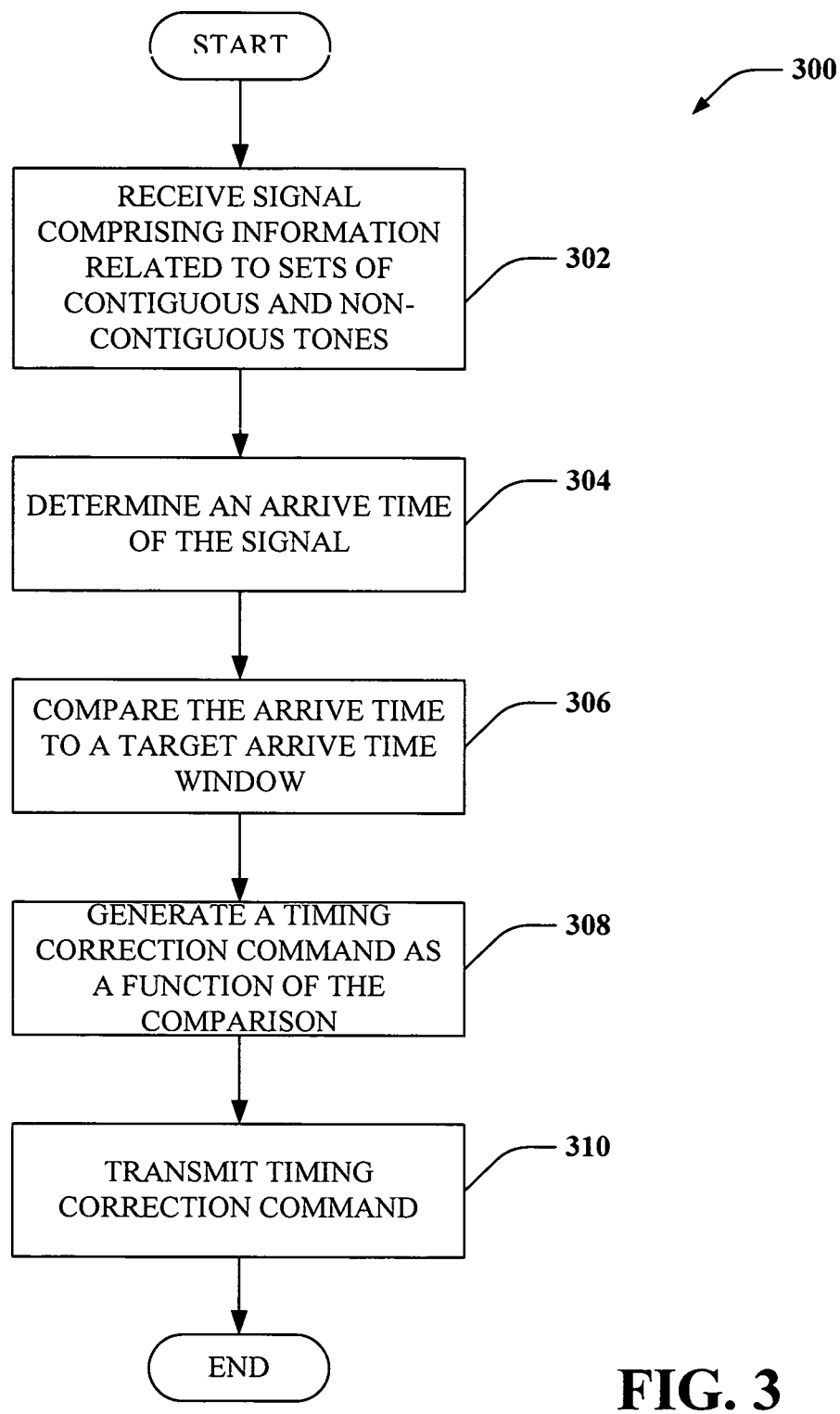
FIG. 3 is an illustration of a methodology for providing an uplink timing control signal for a wireless terminal, in accordance with one or more aspects described herein.
Figure 4:
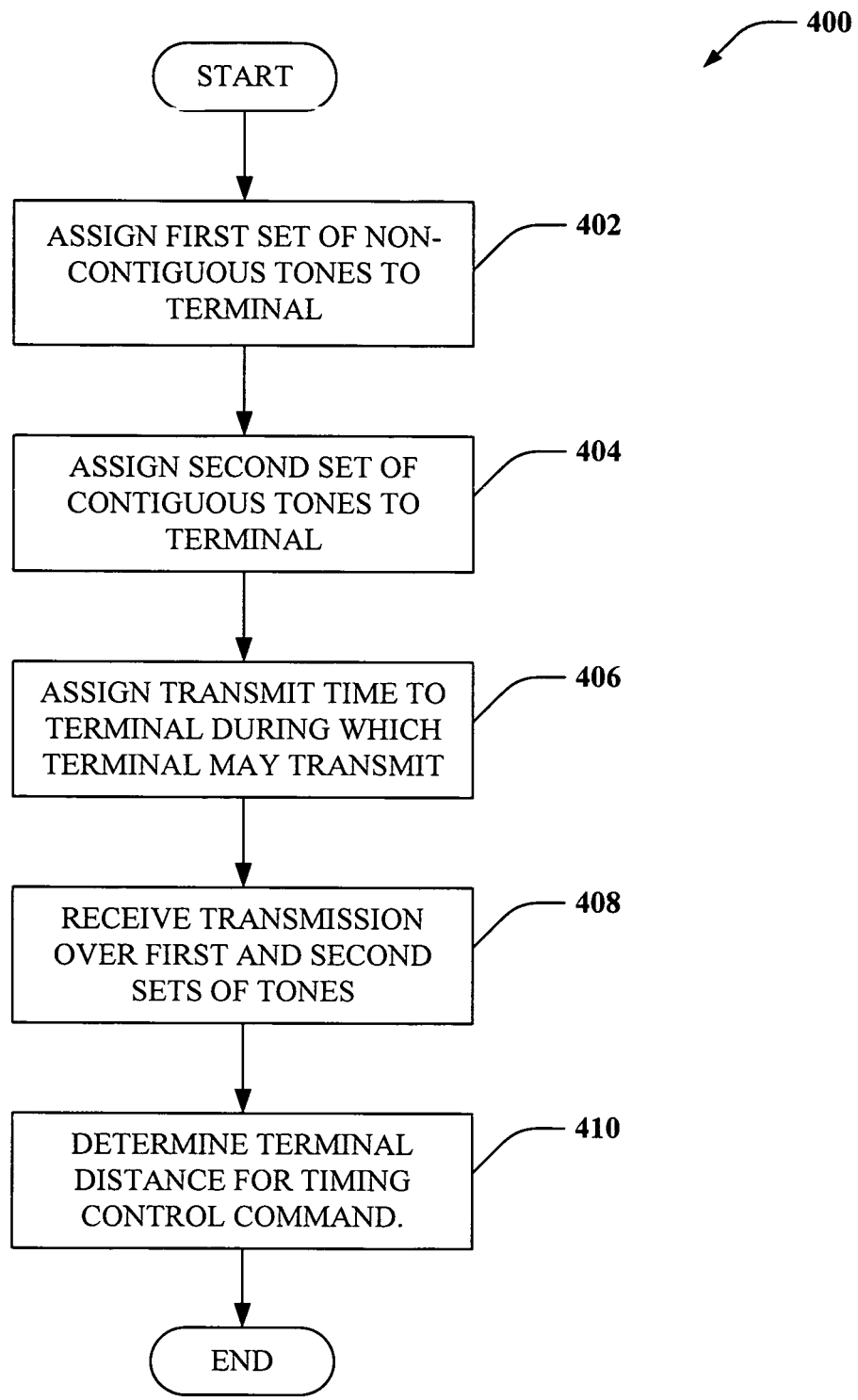
FIG. 4 is an illustration of a methodology for time-synchronizing a wireless device and a base station in a wireless communication environment, in accordance with one or more aspects presented herein.

FIG. 3 is an illustration of a methodology 300 for providing an uplink timing control signal for a wireless terminal, in accordance with one or more aspects described herein. At 302, a base station receiver may receive a signal comprising information related to a first set of non-contiguous tones and a second set of contiguous tones. At 304, an arrival time for the signal may be determined. The determined arrival time of the signal may be compared to a target arrival time window, at 306. If the arrival time is at an early edge of the target arrival time window (e.g., the signal has arrived sooner than expected), then a preliminary conclusion may be drawn that the wireless terminal transmitting the signal earlier than it should. Conversely, if the determined arrival time is closer to a lagging edge of the target arrival time window, then a preliminary conclusion may be drawn that the wireless terminal transmitting later than it should.

At 308, a timing correction command may be generated as a function of the comparison action performed at 306. For example, the arrival time of the signal of the wireless terminal may be coarsely determined (e.g., via waveform analysis) using the contiguous tones, and then a finer determination may be made using the subset of non-contiguous tones which may be evenly spaced across the spectrum of available tones, to more accurately pinpoint the arrival time. At 310, the timing correction command may be transmitted to the wireless terminal to facilitate timing-synchronization between the terminal and the base station.

FIG. 3 is an illustration of a methodology 300 for providing an uplink timing control signal for a wireless terminal, in accordance with one or more aspects described herein. At 302, a base station receiver may receive a signal comprising information related to a first set of non-contiguous tones and a second set of contiguous tones. At 304, an arrival time for the signal may be determined. The determined arrival time of the signal may be compared to a target arrival time window, at 306. If the arrival time is at an early edge of the target arrival time window (e.g., the signal has arrived sooner than expected), then a preliminary conclusion may be drawn that the wireless terminal is transmitting the signal earlier than it should. Conversely, if the determined arrival time is closer to a lagging edge of the target arrival time window, then a preliminary conclusion may be drawn that the wireless terminal is transmitting later than it should.

Figure 5:
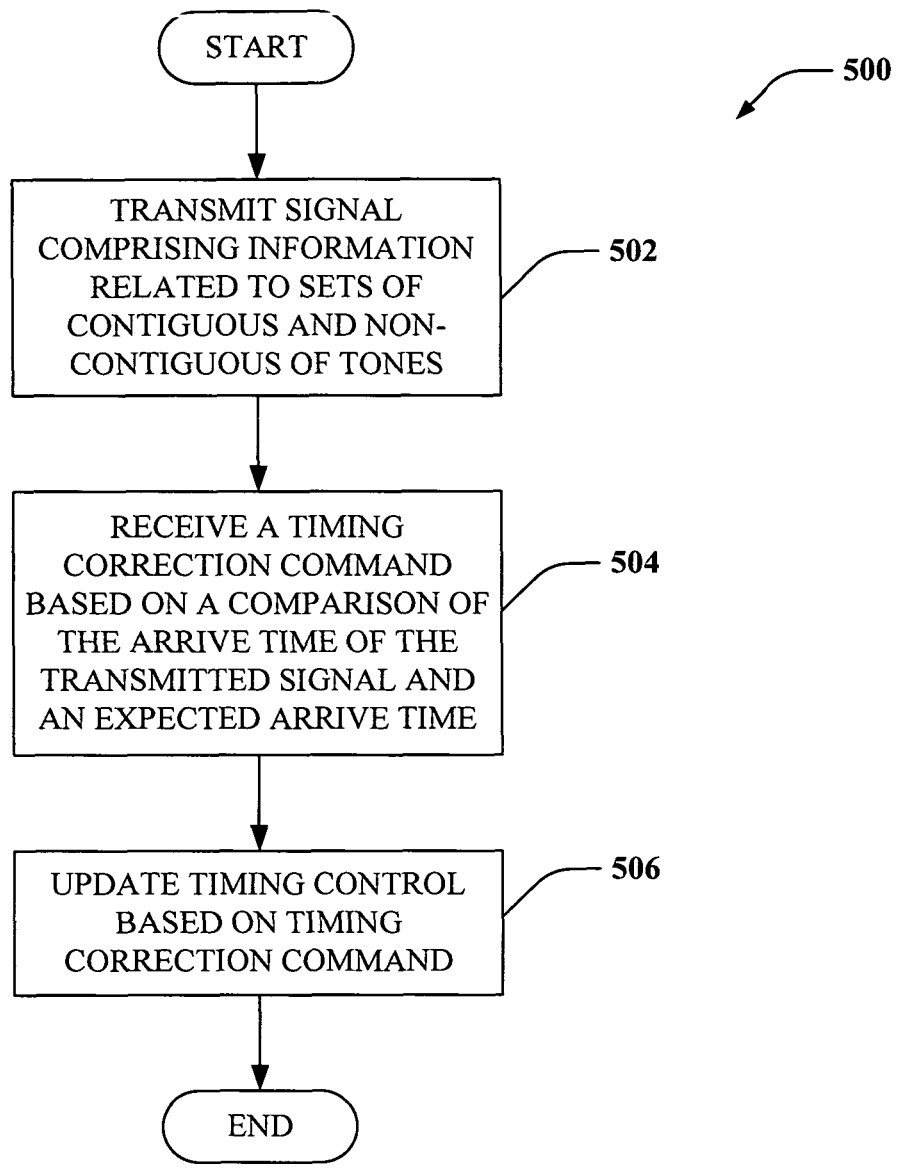
FIG. 5 is an illustration of a methodology for providing an uplink timing control signal for a wireless terminal, in accordance with one or more aspects described herein.

FIG. 5 is an illustration of a methodology 500 for providing an uplink timing control signal for a wireless terminal, in accordance with one or more aspects described herein. At 502, a wireless terminal may transmit a signal comprising information related to a first set of non-contiguous tones and a second set of contiguous tones. A base station receiving the signal may determine an arrival time for the signal and compare it to a target arrival time window (e.g., time period during which the signal is expected to arrive). If the arrival time is at an early edge of the target arrival time window (e.g., the signal has arrived earlier than the target receiver window), then a preliminary conclusion may be drawn that the wireless terminal is transmitting the signal earlier than it should. Conversely, if the determined arrival time is closer to a lagging edge of the target arrival time window (e.g., the signal has arrived later than the target receiver window), then a preliminary conclusion may be drawn that the wireless terminal is transmitting later than it should. For example, the arrival time of the signal from the wireless terminal may be coarsely determined (e.g., via waveform analysis) using the contiguous tones, and then a finer determination may be made using the subset of non-contiguous tones which may be evenly spaced across the spectrum of available tones, to more accurately pinpoint the arrival time. A timing correction command may be generated as a function of the comparison action, at the base station, which may be received at the wireless terminal at 504. At 506, the timing correction command may be implemented by the wireless terminal to facilitate timing-synchronization between the terminal and the base station.

Figure 6:
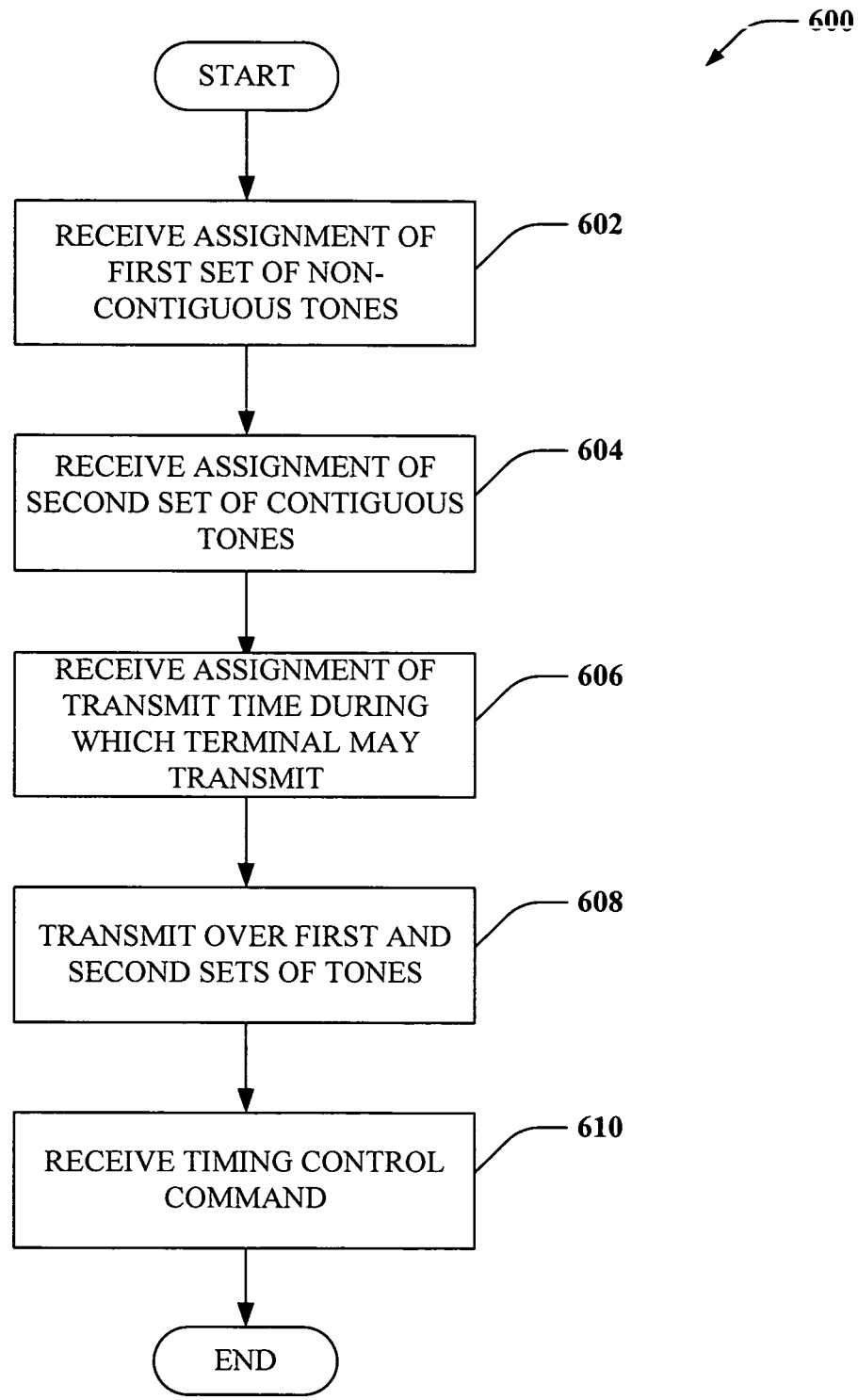
FIG. 6 illustrates a methodology for time-synchronizing a wireless device and a base station in a wireless communication environment, in accordance with one or more aspects presented herein

FIG. 6 is an illustration of a methodology 600 for time-synchronizing a wireless device and a base station in a wireless communication environment, in accordance with one or more aspects presented herein. At 602, an assignment of a first set of non-contiguous tones may be received by a wireless terminal, which may be evenly spaced to facilitate a fine estimation of the signal arrival time when the terminal transmits over the non-contiguous tones. At 604, an assignment of a second set of contiguous tones may be received by the terminal, which may be utilized by the base station to a coarse estimation of the signal arrival time when the base station receives a signal transmitted over the contiguous tones. At 606, a transmission time assignment may be received by the wireless terminal, during which the wireless terminal will be permitted to transmit a signal over the first and second sets of tones. The wireless terminal may then transmit a signal over the first and second tone sets during the assigned transmission period, at 608. The signal arrival time may be determined by the base station to facilitate generating a timing control command as described above, which may be received at the terminal at 610. In this manner, a wireless terminal may facilitate performing timing synchronization between itself and a base station.

According to an aspect, the assigned first tone set and the assigned second tone set have a predetermined relationship, which may be independent of which wireless terminal is assigned. Moreover, the assignment of the first and the second tone sets may be implicitly given by the MAC identifier of the wireless terminal, so that the wireless terminal is assigned a particular recurring sequence of the first and the second tone sets and the transmission time periods associated with the assigned tone sets. Another wireless terminal with a different MAC identifier is assigned a different recurring sequence.

Figure 7:
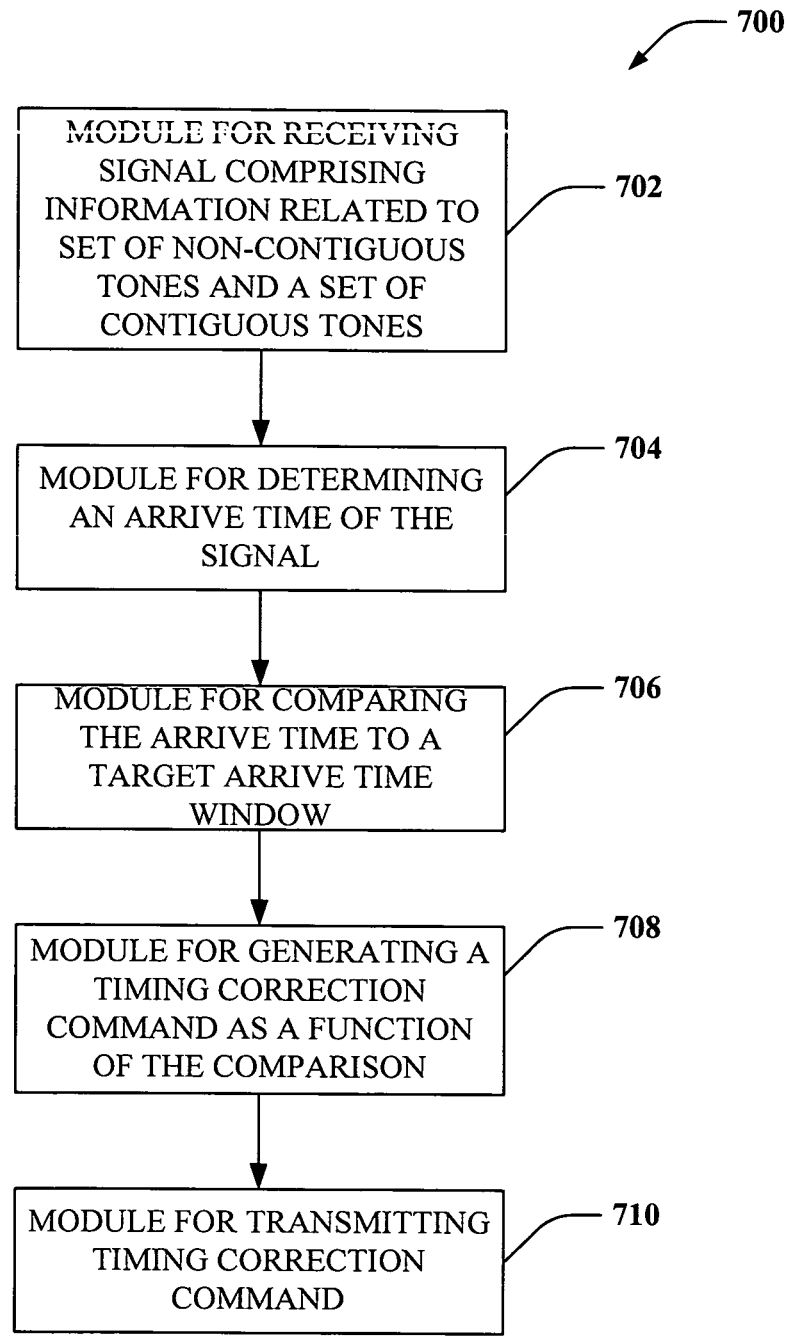
FIG. 7 illustrates a system that facilitates timing synchronization between a wireless terminal and a base station, via an uplink timing control channel segment, in a communication environment, in accordance with one or more aspects described herein

FIG. 7 illustrates a system 700 that facilitates timing synchronization between a wireless terminal and a base station, via an uplink timing control channel segment, in a communication environment, in accordance with one or more aspects described herein. System 700 is represented as a series of interrelated functional blocks, which can represent functions implemented by a processor, software, or combination thereof (e.g., firmware). System 700 comprises a module for receiving 702 that receives a signal comprising information related to two sets of tones: a first set comprising non-contiguous tones, and a second set comprising contiguous tones. The first set of tones may comprise, for instance, 8 non-contiguous tones that are evenly spaced across a spectrum of available tones (e.g., 113 available tones in a given symbol period. The second set of tones may comprise 8 contiguous tones in the spectrum of 113 tones. System 700 also comprises a module for determining an arrival time of the signal 704, which may be based at least in part on waveform analysis of the two tone sets received with the signal. For example, the arrival time of the signal from the wireless terminal may be coarsely determined from the contiguous tone set, and a finer determination thereof may be facilitated by analysis of the non-contiguous tone set. Once an arrival time for the signal has been determined, a module for comparing 706 may compare the arrival time to a target arrival time window during which the signal is expected to arrive based on a known transmission time (which may be assigned by a base station) and a previous distance estimation from a previous time slot. Module for generating a timing correction command 708 may utilize the comparison information to generate a timing control signal for the wireless terminal. System 700 still further comprises a module for transmitting 710, which may transmit the timing control command signal to the wireless terminal to facilitate timing synchronization between the base station and the wireless terminal. It is to be understood that system 700 and the various modules comprised thereby may carry out the methods described above and/or may impart any necessary functionality to the various systems described herein.

Figure 8:
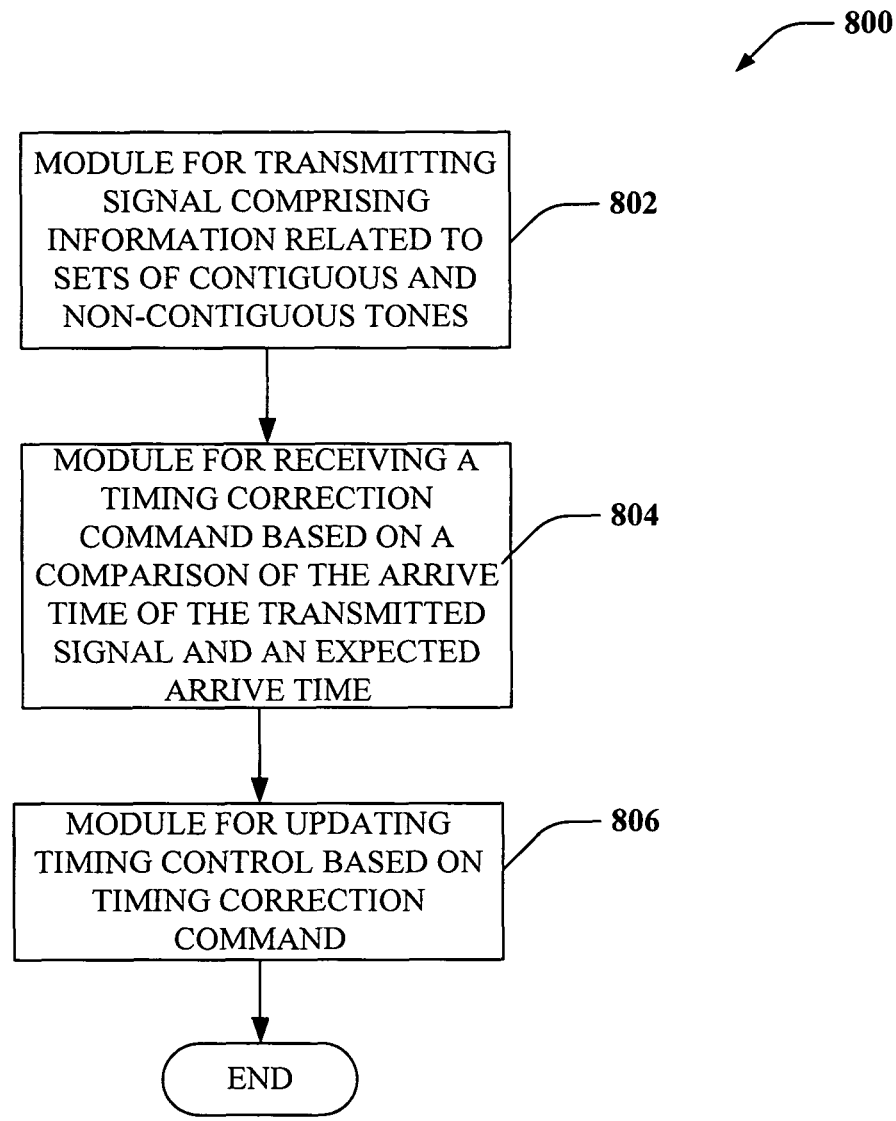
FIG. 8 is an illustration of a system that facilitates timing synchronization between a wireless terminal and a base station in a wireless communication environment, in accordance with one or more aspects

FIG. 8 is an illustration of a system 800 that facilitates timing synchronization between a wireless terminal and a base station in a wireless communication environment, in accordance with one or more aspects. System 800 comprises a module for transmitting 802 a signal comprising information related to a set of non-contiguous tones and a set of contiguous tones to permit a determination of an arrival time of the transmitted signal by a base station to enable timing correction. System 800 may further comprise a module for receiving 804 a timing correction command from a base station to synchronize the wireless terminal to the base station. The received timing control command may be implemented by a module for updating timing control 806. It will be appreciated that the module for receiving 804 may receive various resource assignments from a base station in order to permit the module for transmitting 802 to transmit an appropriately designed signal to the base station. For instance, the module for receiving 804 may receive an assignment of a first set of tones that are non-contiguous, wherein the tones may be evenly spaced across a spectrum of available tones, as well as an assignment of a set of tones that are contiguous to each other. Module for receiving 804 may additionally receive an assignment of a transmit time period during which module for transmitting 802 may transmit the signal comprising the tone set information to permit the base station to determine an arrival time of the signal. Based on the two tone sets, the base station may generate and transmit the timing control command to the wireless terminal.

Figure 9:
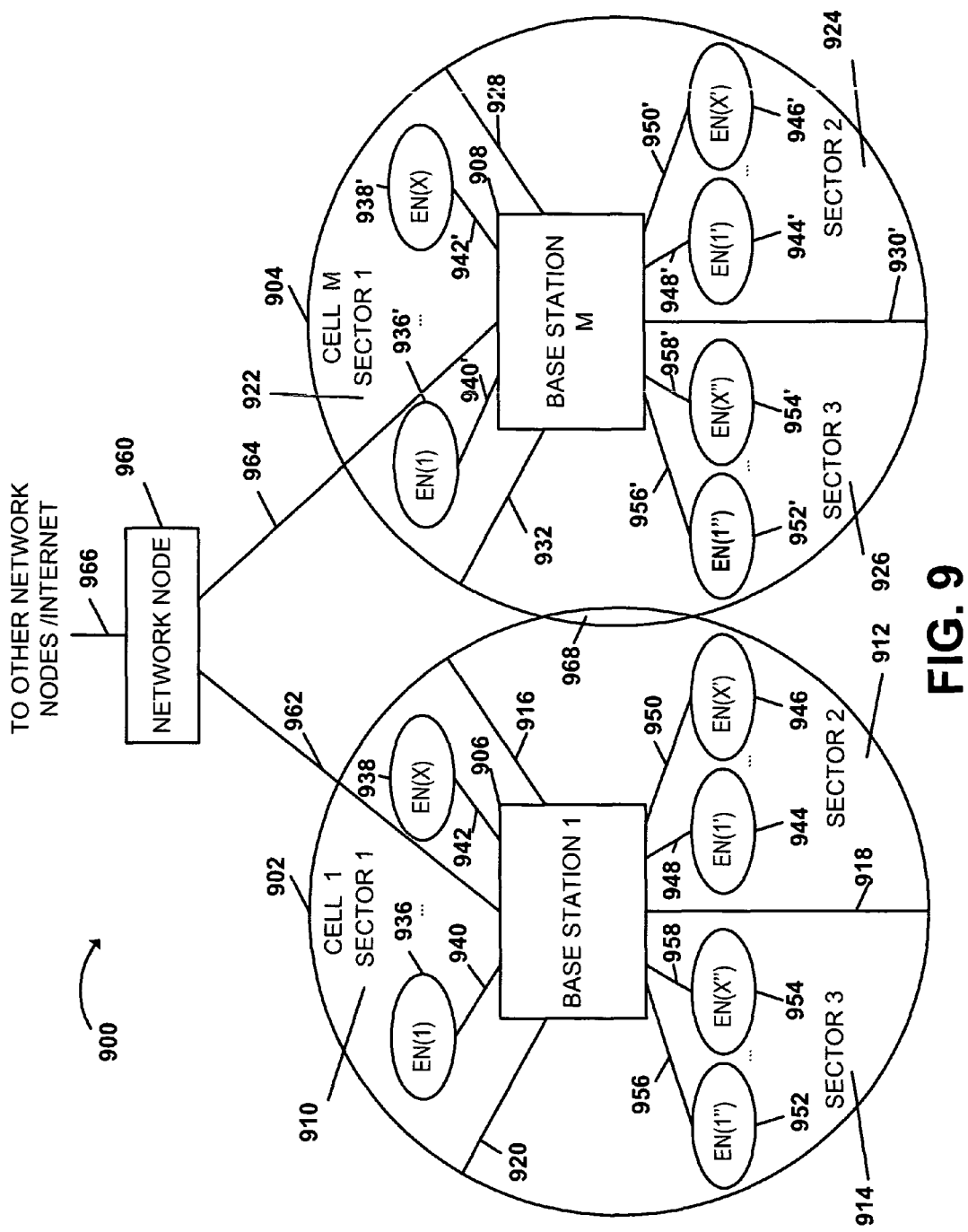
FIG. 9 illustrates an exemplary communication system implemented in accordance with various aspects, including multiple cells.

FIG. 9 shows an exemplary communication system 900 implemented in accordance with the present invention including multiple cells: cell 1 902, cell M 904. Note that neighboring cells 902, 904 overlap slightly, as indicated by cell boundary region 968, thereby providing the potential for signal interference between signals being transmitted by base stations in neighboring cells. Each cell 902, 904 of exemplary system 900 includes three sectors. Cells which have not be subdivided into multiple sectors (N=1), cells with two sectors (N=2) and cells with more than 3 sectors (N>3) are also possible in accordance with the invention. Cell 902 includes a first sector, sector 1 910, a second sector, sector 2 912, and a third sector, sector 3 914. Each sector 910, 912, 914 has two sector boundary regions: each boundary region is shared between two adjacent sectors. Sector boundary regions provide the potential for signal interference between signals being transmitted by base stations in neighboring sectors. Line 916 represents a sector boundary region between sector 1 910 and sector 2 912; line 918 represents a sector boundary region between sector 2 912 and sector 3 914; line 920 represents a sector boundary region between sector 3 914 and sector 1 910. Similarly, cell M 904 includes a first sector, sector 1 922, a second sector, sector 2 924, and a third sector, sector 3 926. Line 928 represents a sector boundary region between sector 1 922 and sector 2 924; line 930 represents a sector boundary region between sector 2 924 and sector 3 926; line 932 represents a boundary region between sector 3 926 and sector 1 922. Cell 1 902 includes a base station (BS), base station 1 906, and a plurality of end nodes (ENs) in each sector 910, 912, 914. Sector 1 910 includes EN(1) 936 and EN(X) 938 coupled to BS 906 via wireless links 940, 942, respectively; sector 2 912 includes EN(1') 944 and EN(X') 946 coupled to BS 906 via wireless links 948, 950, respectively; sector 3 926 includes EN(1") 952 and EN(X") 954 coupled to BS 906 via wireless links 956, 958, respectively. Similarly, cell M 904 includes base station M 908, and a plurality of end nodes (ENs) in each sector 922, 924, 926. Sector 1 922 includes EN(1) 936' and EN(X) 938' coupled to BS M 908 via wireless links 940', 942', respectively; sector 2 924 includes EN(1') 944' and EN(X') 946' coupled to BS M 908 via wireless links 948', 850', respectively; sector 3 826 includes EN(1") 852' and EN(X") 854' coupled to BS 808 via wireless links 956', 958', respectively. System 900 also includes a network node 960 which is coupled to BS1 906 and BS M 908 via network links 962, 964, respectively. Network node 960 is also coupled to other network nodes, e.g., other base stations, AAA server nodes, intermediate nodes, routers, etc. and the Internet via network link 966. Network links 962, 964, 966 may be, e.g., fiber optic cables. Each end node, e.g. EN 1 936 may be a wireless terminal including a transmitter as well as a receiver. The wireless terminals, e.g., EN(1) 936 may move through system 900 and may communicate via wireless links with the base station in the cell in which the EN is currently located. The wireless terminals, (WTs), e.g. EN(1) 936, may communicate with peer nodes, e.g., other WTs in system 900 or outside system 900 via a base station, e.g. BS 906, and/or network node 960. WTs, e.g., EN(1) 936 may be mobile communications devices such as cell phones, personal data assistants with wireless modems etc. Each base station performs tone subset allocation using a different method for the strip-symbol periods in accordance with the invention, from the method employed for allocating tones and determining tone hopping in the rest symbol periods, e.g., non strip-symbol periods. The wireless terminals use the tone subset allocation method of the present invention along with information received from the base station, e.g., base station slope ID, sector ID information, to determine the tones that they can use to receive data and information at specific strip-symbol periods. The tone subset allocation sequence is constructed, in accordance with the invention to spread the inter-sector and inter-cell interference across each of the tones.

Figure 10:
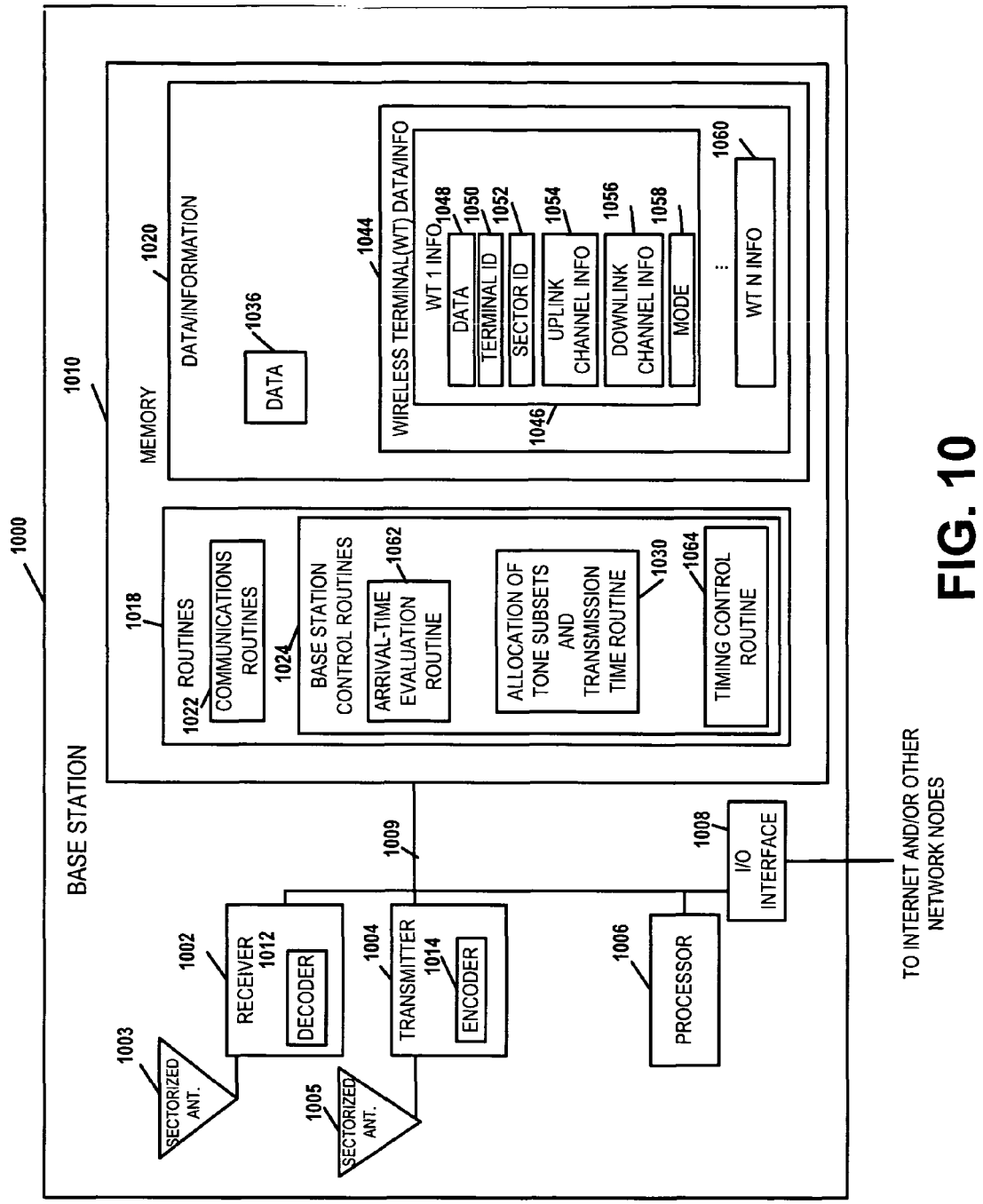
FIG. 10 illustrates an exemplary base station implemented in accordance with one or more aspects.

FIG. 10 illustrates an exemplary base station 1000 in accordance with the present invention. Exemplary base station 1000 implements the tone subset allocation sequences of the present invention, with different tone subset allocation sequences generated for each different sector type of the cell. The base station 1000 may be used as any one of the base stations 906, 908 of the system 900 of FIG. 9. The base station 1000 includes a receiver 1002, a transmitter 1004, a processor 1006, e.g., CPU, an input/output interface 1008 and memory 1010 which are coupled together by a bus 1009 over which the various elements 1002, 1004, 1006, 1008, and 1010 may interchange data and information.

Sectorized antenna 1003 coupled to receiver 1002 is used for receiving data and other signals, e.g., channel reports, from wireless terminals transmissions from each sector within the base station's cell. Sectorized antenna 1005 coupled to transmitter 1004 is used for transmitting data and other signals, e.g., control signals, pilot signal, beacon signals, etc. to wireless terminals 1100 (see FIG. 11) within each sector of the base station's cell. In various embodiments of the invention, base station 1000 may employ multiple receivers 1002 and multiple transmitters 1004, e.g., an individual receivers 1002 for each sector and an individual transmitter 1004 for each sector. The processor 1006, may be, e.g., a general purpose central processing unit (CPU). Processor 1006 controls operation of the base station 1000 under direction of one or more routines 1018 stored in memory 1010 and implements the methods of the present invention. I/O interface 1008 provides a connection to other network nodes, coupling the BS 1000 to other base stations, access routers, AAA server nodes, etc., other networks, and the Internet. Memory 1010 includes routines 1018 and data/information 1020.

Data/information 1020 includes data 1036, and wireless terminal (WT) data/info 1044 including a plurality of sets of WT information: WT 1 info 1046 and WT N info 1060. Each set of WT info, e.g., WT 1 info 1046 includes data 1048, terminal ID 1050, sector ID 1052, uplink channel information 1054, downlink channel information 1056, and mode information 1058.

Routines 1018 include communications routines 1022 and base station control routines 1024. Base station control routines 1024 includes An allocation of tone subsets and transmission time period routine 1030 for uplink channels. Allocation of tone subsets and transmission time period 1030 may assign tone sets to one or more wireless terminals. For instance, processor 1006 may implement allocation of tone subsets and transmission time period routine 1030 to assign a first set of non-contiguous tones to a terminal, and a second set of contiguous tones, as set forth above with regard to preceding figures. Receiver 1002 may receive a signal comprising information related to the assigned tone subsets, upon which processor 1006 may implement an arrive-time evaluation routine 1062 that determines an arrival time of the signal (e.g., utilizing both the non-contiguous tone subset and the contiguous tone subset) and compares the determined arrival time to an and expected arrival time period for the signal. Based on the comparison, a timing control routine 1064 may be implemented to generate a timing control command instructing the terminal to adjust its transmission time to synchronize the terminal with the base station. The timing control command may then be transmitted by transmitter 1004.

Data 1036 includes data to be transmitted that will be sent to encoder 1014 of transmitter 1004 for encoding prior to transmission to WTs, and received data from WTs that has been processed through decoder 1012 of receiver 1002 following reception.

Data 10410 may include data that WT1 1100 has received from a peer node, data that WT 1 1100 desires to be transmitted to a peer node, and downlink channel quality report feedback information. Terminal ID 1050 is a base station 1000 assigned ID that identifies WT 1 1100. Sector ID 1052 includes information identifying the sector in which WT 1 1100 is operating. Sector ID 1052 can be used, for example, to determine the sector type. Uplink channel information 1054 includes information identifying channel segments for WT1 1100 to use, e.g., uplink traffic channel segments for data dedicated uplink control channels for requests, power control, timing control, etc. Each uplink channel assigned to WT1 1100 includes one or more logical tones, each logical tone following an uplink hopping sequence in accordance with the present invention. Downlink channel information 1056 includes information identifying channel segments to carry data and/or information to WT1 1100, e.g., downlink traffic channel segments for user data. Each downlink channel assigned to WT 1 1100 includes one or more logical tones, each following a downlink hopping sequence. Mode information 1058 includes information identifying the state of operation of WT 11100, e.g. sleep, hold, on.

Communications routines 1022 control the base station 1000 to perform various communications operations and implement various communications protocols. Base station control routines 1024 are used to control the base station 1000 to perform basic base station functional tasks, e.g., signal generation and reception, scheduling, and to implement the steps of the method of the present invention including transmitting signals to wireless terminals using the tone subset allocation sequences of the present invention during the strip-symbol periods.

Allocation of tone subset and transmission time period routine 1030 constructs the tone subset to be used in a strip-symbol period in accordance with the present invention using the method of the present invention and data/info 1020 including and sector ID 1052. The downlink tone subset allocation sequences will be different for each sector type in a cell and different for adjacent cells. The WTs 1100 receive the signals in the strip-symbol periods in accordance with the downlink tone subset allocation sequences; the base station 1000 uses the same downlink tone subset allocation sequences in order to generate the transmitted signals.

Figure 11:
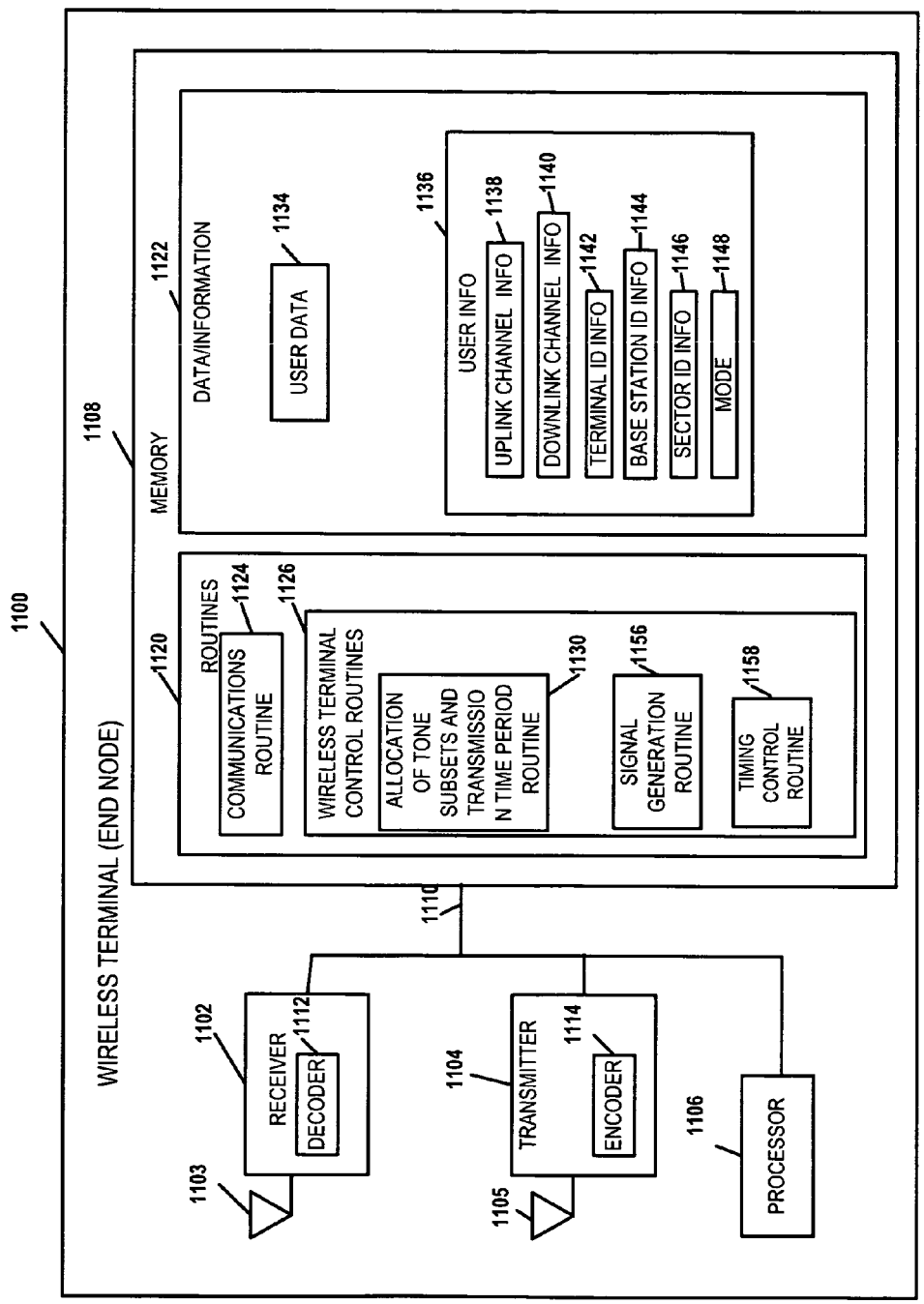
FIG. 11 illustrates an exemplary wireless terminal implemented in accordance with various aspects.

FIG. 11 illustrates an exemplary wireless terminal (end node) 1100 which can be used as any one of the wireless terminals (end nodes), e.g., EN(1) 936, of the system 900 shown in FIG. 9. Wireless terminal 1100 implements the tone subset allocation sequences, in accordance with the present invention. The wireless terminal 1100 includes a receiver 1102 including a decoder 1112, a transmitter 1104 including an encoder 1114, a processor 1106, and memory 1108 which are coupled together by a bus 1110 over which the various elements 1102, 1104, 1106, 1108 can interchange data and information. An antenna 1103 used for receiving signals from a base station 906 is coupled to receiver 1102. An antenna 1105 used for transmitting signals, e.g., to base station 906 is coupled to transmitter 1104.

According to various aspects, receiver 1102 may receive a plurality of resource assignments from a base station, which may include without being limited to, a first tone assignment comprising a subset of non-contiguous tones, which may be evenly spaced across a spectrum of available tones, as well as a second tone assignment comprising a subset of contiguous tones. Receiver 1102 may additionally receive a transmission time assignment, during which the terminal 1100 may transmit a signal related to the two subsets of tones. In some aspects, the assignment of tone sets and transmission time periods may be implicitly given by the MAC identifier of the wireless terminal, in which case, the wireless terminal receives the assignment of the MAC identifier and then derives the assigned tone sets and transmission time periods from the received MAC identifier. For instance, processor 1106 may implement a signal generation routine 1156 that generates a signal comprising information related to the assigned tone subsets, which may be transmitted by transmitter 1104 to a base station. The base station may then provide a timing control command to wireless terminal 1100. Upon receipt of the timing control command by receiver 1102, processor 1106 may implement a timing control routine that evaluates the timing control command and adjusts the transmission time of the wireless terminal to synchronize the terminal with the base station.

The processor 1106, e.g., a CPU controls the operation of the wireless terminal 1100 and implements methods of the present invention by executing routines 1120 and using data/information 1122 in memory 1108. Data/information 1122 includes user data 1134, and user information 1136. User data 1134 may include data, intended for a peer node, which will be routed to encoder 1114 for encoding prior to transmission by transmitter 1104 to base station 906, and data received from the base station 906 which has been processed by the decoder 1112 in receiver 1102. User information 1136 includes uplink channel information 1138, downlink channel information 1140, terminal ID information 1142, base station ID information 1144, sector ID information 1146, and mode information 1148. Uplink channel information 1138 includes information identifying uplink channels segments that have been assigned by base station 906 for wireless terminal 1100 to use when transmitting to the base station 906. Uplink channels may include uplink traffic channels, dedicated uplink control channels, e.g., request channels, power control channels and timing control channels. Each uplink channel include one or more logic tones, each logical tone following an uplink tone hopping sequence in accordance with the present invention. The uplink hopping sequences are different between each sector type of a cell and between adjacent cells. Downlink channel information 1140 includes information identifying downlink channel segments that have been assigned by base station 906 to WT 1100 for use when BS 906 is transmitting data/information to WT 1100. Downlink channels may include downlink traffic channels and assignment channels, each downlink channel including one or more logical tone, each logical tone following a downlink hopping sequence, which is synchronized between each sector of the cell.

User info 1136 also includes terminal ID information 1142, which is a base station 906 assigned identification, base station ID information 1144 which identifies the specific base station 906 that WT has established communications with, and sector ID info 1146 which identifies the specific sector of the cell where WT 1100 is presently located. Base station ID 1144 provides a cell slope value and sector ID info 1146 provides a sector index type; the cell slope value and sector index type may be used to derive the uplink tone hopping sequences in accordance with the invention. Mode information 1148 also included in user info 1136 identifies whether the WT 1100 is in sleep mode, hold mode, or on mode.

Routines 1120 include communications routines 1124 and wireless terminal control routines 1126. Communications routines 1124 control the various communications protocols used by WT 1100. Wireless terminal control routines 1126 controls basic wireless terminal 1100 functionality including the control of the receiver 1102 and transmitter 1104. Wireless terminal control routines 1126 include an allocation of tone subsets and transmission time period 1130 for the strip-symbol periods. Allocation of tone subsets and transmission time period routine 1130 uses user data/info 1122 including downlink channel information 1140, base station ID info 1144, e.g., slope index and sector type, in order to generate the downlink tone subset allocation sequences in accordance with the present invention and process received data transmitted from base station 906. Allocation of tone subsets and transmission time period routine 1130, when executed by processor 1106, is used to determine when and on which tones the wireless terminal 1100 is to receive one or more strip-symbol signals from the base station 906. Allocation of tone subsets and transmission time period 1130 uses a tone subset allocation function, implemented in accordance with the present invention, along with information received from the base station 906, to determine the tones in which it should transmit on.

Figure 12:
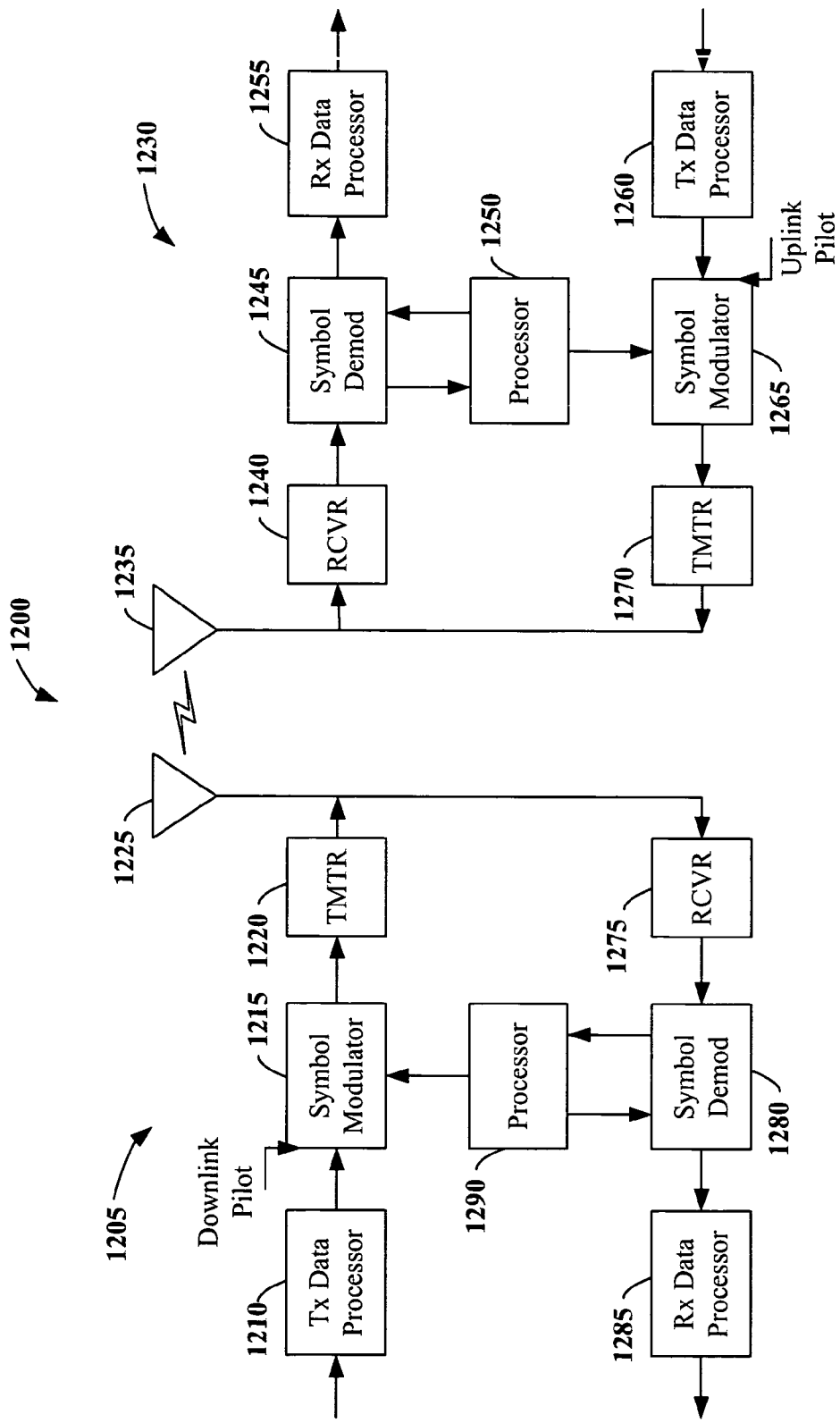
FIG. 12 is an illustration of a wireless communication environment that can be employed in conjunction with the various systems and methods described herein.

FIG. 12 shows an example wireless communication system 1200. The wireless communication system 1200 depicts one base station and one user device for sake of brevity. However, it is to be appreciated that the system can include more than one base station and/or more than one user device, wherein additional base stations and/or user devices can be substantially similar or different from the exemplary base station and user device described below. In addition, it is to be appreciated that the base station and/or the user device can employ the systems and/or methods described herein.

Referring now to FIG. 12, on a downlink, at access point 1205, a transmit (TX) data processor 1210 receives, formats, codes, interleaves, and modulates (or symbol maps) traffic data and provides modulation symbols ("data symbols"). A symbol modulator 1215 receives and processes the data symbols and pilot symbols and provides a stream of symbols. Symbol modulator 1215 multiplexes data and pilot symbols and provides them to a transmitter unit (TMTR) 1220. Each transmit symbol may be a data symbol, a pilot symbol, or a signal value of zero. The pilot symbols may be sent continuously in each symbol period. The pilot symbols can be frequency division multiplexed (FDM), orthogonal frequency division multiplexed (OFDM), time division multiplexed (TDM), frequency division multiplexed (FDM), or code division multiplexed (CDM).

TMTR 1220 receives and converts the stream of symbols into one or more analog signals and further conditions (e.g., amplifies, filters, and frequency upconverts) the analog signals to generate a downlink signal suitable for transmission over the wireless channel. The downlink signal is then transmitted through an antenna 1225 to the user devices. At user device 1230, an antenna 1235 receives the downlink signal and provides a received signal to a receiver unit (RCVR)

1240. Receiver unit 1240 conditions (e.g., filters, amplifies, and frequency downconverts) the received signal and digitizes the conditioned signal to obtain samples. A symbol demodulator 1245 demodulates and provides received pilot symbols to a processor 1250 for channel estimation. Symbol demodulator 1245 further receives a frequency response estimate for the downlink from processor 1250, performs data demodulation on the received data symbols to obtain data symbol estimates (which are estimates of the transmitted data symbols), and provides the data symbol estimates to an RX data processor 1255, which demodulates (e.g., symbol demaps), deinterleaves, and decodes the data symbol estimates to recover the transmitted traffic data. The processing by symbol demodulator 1245 and RX data processor 1255 is complementary to the processing by symbol modulator 1215 and TX data processor 1210, respectively, at access point 1205.

On the uplink, a TX data processor 1260 processes traffic data and provides data symbols. A symbol modulator 1265 receives and multiplexes the data symbols with pilot symbols, performs modulation, and provides a stream of symbols. A transmitter unit 1270 then receives and processes the stream of symbols to generate an uplink signal, which is transmitted by the antenna 1235 to the access point 1205.

At access point 1205, the uplink signal from user device 1230 is received by the antenna 1225 and processed by a receiver unit 1275 to obtain samples. A symbol demodulator 1280 then processes the samples and provides received pilot symbols and data symbol estimates for the uplink. An RX data processor 1285 processes the data symbol estimates to recover the traffic data transmitted by user device 1230. A processor 1290 performs channel estimation for each active user device transmitting on the uplink. Multiple user devices may transmit pilot concurrently on the uplink on their respective assigned sets of pilot subcarriers, where the pilot subcarrier sets may be interlaced.

Processors 1290 and 1250 direct (e.g., control, coordinate, manage, etc.) operation at access point 1205 and user device 1230, respectively. Respective processors 1290 and 1250 can be associated with memory units (not shown) that store program codes and data. Processors 1290 and 1250 can utilize any of the methodologies described herein. Respective Processors 1290 and 1250 can also perform computations to derive frequency and impulse response estimates for the uplink and downlink, respectively.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of synchronizing a wireless terminal with a base station in an OFDM wireless communication environment, comprising:
    receiving a signal comprising a set of tones from the wireless terminal, the set of tones comprising a first subset of equally-spaced non-contiguous tones and a second subset of contiguous tones, the first subset of equally-spaced non-contiguous tones and the second subset of contiguous tones having the same number of tones;
    determining an arrival time of the signal;
    comparing the arrival time of the signal to a target arrival time window;
    generating a timing correction command as a function of the comparison of the arrival time to the target arrival time window, the timing correction command used to instruct the wireless terminal to adjust timing control; and
    transmitting the timing correction command.

2. The method of claim 1, wherein any adjacent two tones of the first subset are at least two tones apart.

3. The method of claim 1, wherein each of the first and the second subsets have 8 tones.

4. The method of claim 3, further comprising assigning a transmit time for the wireless terminal.

5. The method of claim 1, wherein the duration of the signal is one symbol period.

6. An apparatus that facilitates performing timing synchronization between a wireless terminal and a base station, comprising:
    a receiver in a base station that receives a signal comprising a set of tones from a wireless terminal, the set of tones comprising a first subset of equally-spaced non-contiguous tones and a second subset of contiguous tones, the first subset of equally-spaced non-contiguous tones and the second subset of contiguous tones having the same number of tones;
    a processor that determines an arrival time of the signal and compares the arrival time of the signal to a target arrival time, and generates a timing correction command as a function of the comparison of the arrival time to the target arrival time, the timing correction command used to instruct the wireless terminal to adjust timing control; and
    a transmitter that sends a timing correction command to the wireless terminal.

7. The apparatus of claim 6, wherein any adjacent two tones of the first subset are at least two tones apart.

8. The apparatus of claim 6, wherein each of the first and the second subsets have 8 tones.

9. The apparatus of claim 8, wherein the processor assigns a transmit time for the wireless terminal.

10. The apparatus of claim 6, wherein the duration of the signal is one symbol period.

11. An apparatus that facilitates synchronizing a wireless terminal and a base station, comprising:
    means for receiving a signal from the wireless terminal, the signal comprising a set of tones, the set of tones comprising a first subset of equally-spaced non-contiguous tones and a second subset of contiguous tones, the first subset of equally-spaced non-contiguous tones and the second subset of contiguous tones having the same number of tones;
    means for determining an arrival time of the signal at the base station;
    means for comparing the arrival time to a target arrival time;

means for generating a timing correction command signal as a function of the comparison of the arrival time to the target arrival time, the tinting correction command signal used to instruct the wireless terminal to adjust timing control; and means for transmitting the timing correction command signal to the wireless terminal.

12. The apparatus of claim 11, wherein any adjacent two tones of the first subset are at least two tones apart.

13. The apparatus of claim 11, wherein each of the first and the second subsets have 8 tones.

14. The apparatus of claim 13, wherein the means for assigning assigns a transmit time for the wireless terminal.

15. The apparatus of claim 11, wherein the duration of the signal is one symbol period.

16. A non-transitory computer-readable medium having stored thereon computer-readable instructions, the instructions comprising:

receiving, utilizing a receiver, a signal comprising a set of tones from a wireless terminal, the set of tones comprising a first subset of equally-spaced non-contiguous tones and a second subset of contiguous tones, the first subset of equally-spaced non-contiguous tones and the second subset of contiguous tones having the same number of tones;

analyzing, utilizing a processor, the signal to determine an arrival time of the signal;

comparing, utilizing the processor, the arrival time of the signal to a target arrival time window;

generating, utilizing the processor, a timing correction command as a function of the comparison of the arrival time to the target arrival time window, the timing correction command used to instruct the wireless terminal to adjust timing control; and transmitting, utilizing a transmitter, the timing correction command to the wireless terminal.

17. The non-transitory computer-readable medium of claim 16, wherein any adjacent two tones of the first subset are at least two tones apart.

18. The non-transitory computer-readable medium of claim 16, wherein each of the first and the second subsets have 8 tones.

19. The non-transitory computer-readable medium of claim 18, the instructions further comprising assigning a transmit time for the wireless terminal.

20. The non-transitory computer-readable medium of claim 16, wherein the duration of the signal is one symbol period.

21. A method of synchronizing a wireless terminal to a base station in a communication environment, comprising:

transmitting a signal comprising a set of tones from the wireless terminal, the set of tones comprising a first subset of equally-spaced non-contiguous tones and a second subset of contiguous tones, the first subset of equally-spaced non-contiguous tones and the second subset of contiguous tones having the same number of tones;

receiving a timing control command that is generated as a function of a comparison of the arrival time of the signal as determined from the set of tones and an expected arrival time of the signal, the timing control command used to instruct the wireless terminal to adjust timing control; and adjusting the timing control for the wireless terminal based on the timing control command.

22. The method of claim 21, wherein any adjacent two tones of the first subset are at least two tones apart.

23. The method of claim 21, wherein each of the first and the second subsets have 8 tones.

24. The method of claim 23, wherein the transmission of the signal occurs during an assigned transmit time.

25. The method of claim 21, wherein the duration of the signal is one symbol period.

26. An apparatus that facilitates synchronizing a wireless terminal to a base station in a wireless communication environment, comprising:

a receiver that receives a tone set assignment comprising a first subset of equally-spaced non-contiguous tones and a second subset of contiguous tones, and a transmission time assignment defining a time at which the wireless terminal is to transmit a signal, the first subset of equally-spaced non-contiguous tones and the second subset of contiguous tones having the same number of tones;

a processor that generates a signal comprising information related to the tone set; and a transmitter that transmits the signal at the assigned transmission time to a base station;

wherein the receiver receives a timing control command that is generated as a function of a comparison of the arrival time of the signal as determined from the set of tones and an expected arrival time of the signal, the timing control command used to instruct the wireless terminal to adjust timing control.

27. The apparatus of claim 26, wherein any adjacent two tones of the first subset are at least two tones apart.

28. The apparatus of claim 26, wherein each of the first and the second subsets have 8 tones.

29. The apparatus of claim 26, wherein the duration of the signal is one symbol period.

30. An apparatus that facilitates synchronizing a wireless terminal to a base station in a wireless communication environment, comprising:

means for transmitting a signal comprising a set of tones from a wireless terminal, the set of tones comprising a first subset of equally-spaced non-contiguous tones and a second subset of contiguous tones, the first subset of equally-spaced non-contiguous tones and the second subset of contiguous tones having the same number of tones;

means for receiving a timing control command that is generated as a function of a comparison of the arrival time of the signal as determined from the set of tones and an expected arrival time of the signal, the timing control command used to instruct the wireless terminal to adjust timing control; and means for adjusting the timing control for the wireless terminal based on the timing control command.

31. The apparatus of claim 30, wherein any adjacent two tones of the first subset are at least two tones apart.

32. The apparatus of claim 30, wherein each of the first and the second subsets have 8 tones.

33. The apparatus of claim 32, wherein the means for transmitting transmits during an assigned transmit time.

34. The apparatus of claim 30, wherein the duration of the signal is one symbol period.

35. A non-transitory computer-readable medium having stored thereon computer-executable instructions for:

transmitting, utilizing a transmitter, a signal comprising a set of tones from a wireless terminal, the set of tones comprising a first subset of equally-spaced non-contiguous tones and a second subset of contiguous tones, the first subset of equally-spaced non-contiguous tones and the second subset of contiguous tones having the same number of tones;

receiving, utilizing a receiver, a timing control command that is generated as a function of a comparison of the arrival time of the signal as determined from the set of tones and an expected arrival time of the signal; the timing control command used to instruct the wireless terminal to adjust timing control; and adjusting, utilizing a processor, the timing control for the wireless terminal based on the timing control command.

36. The non-transitory computer-readable medium of claim 35, wherein any adjacent two tones are at least two tones apart.

37. The non-transitory computer-readable medium of claim 35, wherein each of the first and the second subsets have 8 tones.

38. The non-transitory computer-readable medium of claim 37, further comprising instructions for transmitting during an assigned transmit time.

39. The non-transitory computer-readable medium of claim 35, wherein the duration of the signal is one symbol period.

40. The method of claim 1, wherein determining an arrival time of the signal comprises using the contiguous tones and the non-contiguous tones to determine the arrival time.

41. The method of claim 30, wherein transmitting the timing correction command is to allow synchronization of the wireless terminal with the base station.

42. The method of claim 41, wherein determining the arrival time is based on a calculation.

* * * * *